United States Patent [19]

Rich

[11] Patent Number: 4,879,033

[45] Date of Patent: Nov. 7, 1989

[54] SLURRY PLOW

[75] Inventor: Arthur R. Rich, Caddo Mills, Tex.

[73] Assignee: Pilgrim's Pride Corporation, Pittsburg, Tex.

[21] Appl. No.: 237,604

[22] Filed: Aug. 26, 1988

[51] Int. Cl.⁴ .................... B01D 33/04; B01D 33/36
[52] U.S. Cl. .................................. 210/396; 210/386; 210/400; 210/401
[58] Field of Search ................ 210/386, 396, 400, 401

[56] References Cited

U.S. PATENT DOCUMENTS

| | | | |
|---|---|---|---|
| 3,984,329 | 10/1976 | Wenzel | 210/396 |
| 4,354,935 | 10/1982 | Austin et al. | 210/400 |
| 4,456,530 | 6/1984 | Eustacchio et al. | 210/396 |
| 4,602,998 | 7/1986 | Goron | 210/396 |
| 4,609,467 | 9/1986 | Morales | 210/400 |
| 4,729,836 | 3/1988 | Ickinger et al. | 210/396 |

Primary Examiner—Richard V. Fisher
Assistant Examiner—Matthew Savage
Attorney, Agent, or Firm—Sigalos, Levine & Montgomery

[57] ABSTRACT

An improved slurry plow which includes provisions for both vertical and horizontal adjustment, characterized in that the plow includes a housing, a telescoping lower member which is spring loaded to retain the lower surface of the plow in slidable contact with an associated moving belt, and further including provisions to permit adjustment of the pressure exerted by the sliding contact and to provide vertical adjustment of the telescoping member.

20 Claims, 2 Drawing Sheets 4,879,033

SLURRY PLOW

BACKGROUND OF THE INVENTION

This invention relates to slurry agitation, and more particularly to an improved plow and array of such plows, especially suited for thick mixtures such as sludge.

Slurry plows have heretofore been known, illustrative of which are those disclosed in U.S. Pat. Nos. 3,984,329, granted to Lothar Wenzel et al. on Oct. 1976, 4,602,998, granted to John Goron on July 29, 1986, and 4,609,467, granted to Ramon A. Morales on Sept. 2, 1986. While each of these proposals involve devices and arrays for breaking up layers of sludge so as to facilitate the dewatering thereof, they did not provide for adjustable movement in both a horizontal and a vertical direction while at the same time providing for adjustment to compensate for sag in support members. Accordingly, there continued to be the need for an improved plow and plow assembly in which provision is made for adjustment in both vertical and horizontal directions while simultaneously providing for individual adjustment to compensate for sag or similar geometric anomaly.

SUMMARY OF THE INVENTION

In accordance with the principles of the invention hereof, an improved plow includes provisions for both vertical and horizontal adjustment, while simultaneously including provisions to compensate for non-planar geometry of support members. Each plow includes a housing to which there is fastened an adjusting extension which allows for longitudinal adjustment and positioning. In addition, each plow includes a telescoping lower member which is spring loaded to retain the lower surface of the plow in slidable contact with an associated moving belt while at the same time including a knurled adjustment knob to permit adjustment of the pressure exerted by the aforementioned slidable contact and/or to provide vertical compensation for any sag or other non-planarity in members that may be employed to support a plurality of plows.

OBJECTS AND FEATURES

It is one general object of this invention to improve slurry plows.

It is another object of the invention to improve adjustment of slurry plows to permit compensation for certain geometrical anomalies.

It is still another object of the invention to provide both vertical and horizontal adjustment while simultaneously retaining the adjustability of pressure exerted between the lower extremity of the plow and the adjacent moving conveyor.

Accordingly, in accordance with the one feature of the invention, each plow includes a suspension arm having an aperture, thereby permitting the longitudinal adjustment of the plow and the fastening of the plows in desired longitudinal positions.

In accordance with another feature of the invention, each plow is equipped with a knurled knob at the top thereof to provide for vertical adjustment of the plow member, thereby permitting compensatory positioning to compensate for sag and/or other anomalous geometrical configurations in other parts of the equipment.

In accordance with still another feature of the invention, in an alternate embodiment, knurled knob adjustment is provided for adjusting pressure between the foot of each plow and its associated or adjacent moving conveyor member, thereby permitting more uniform contact between the lower extremities of the plows and the adjacent moving conveyor.

In accordance with still another feature of the invention, the use of spring-loading and telescoping of the lower extremity of the plow, provision is made for the plow to ride up and over material conglomerates, thereby improving plow effectiveness and reducing damage thereto.

These and other objects and features of the invention will be apparent from the following detailed description by way of a preferred embodiment, with reference to the drawing.

DRAWING

DETAILED DESCRIPTION

Figures 1, 2:
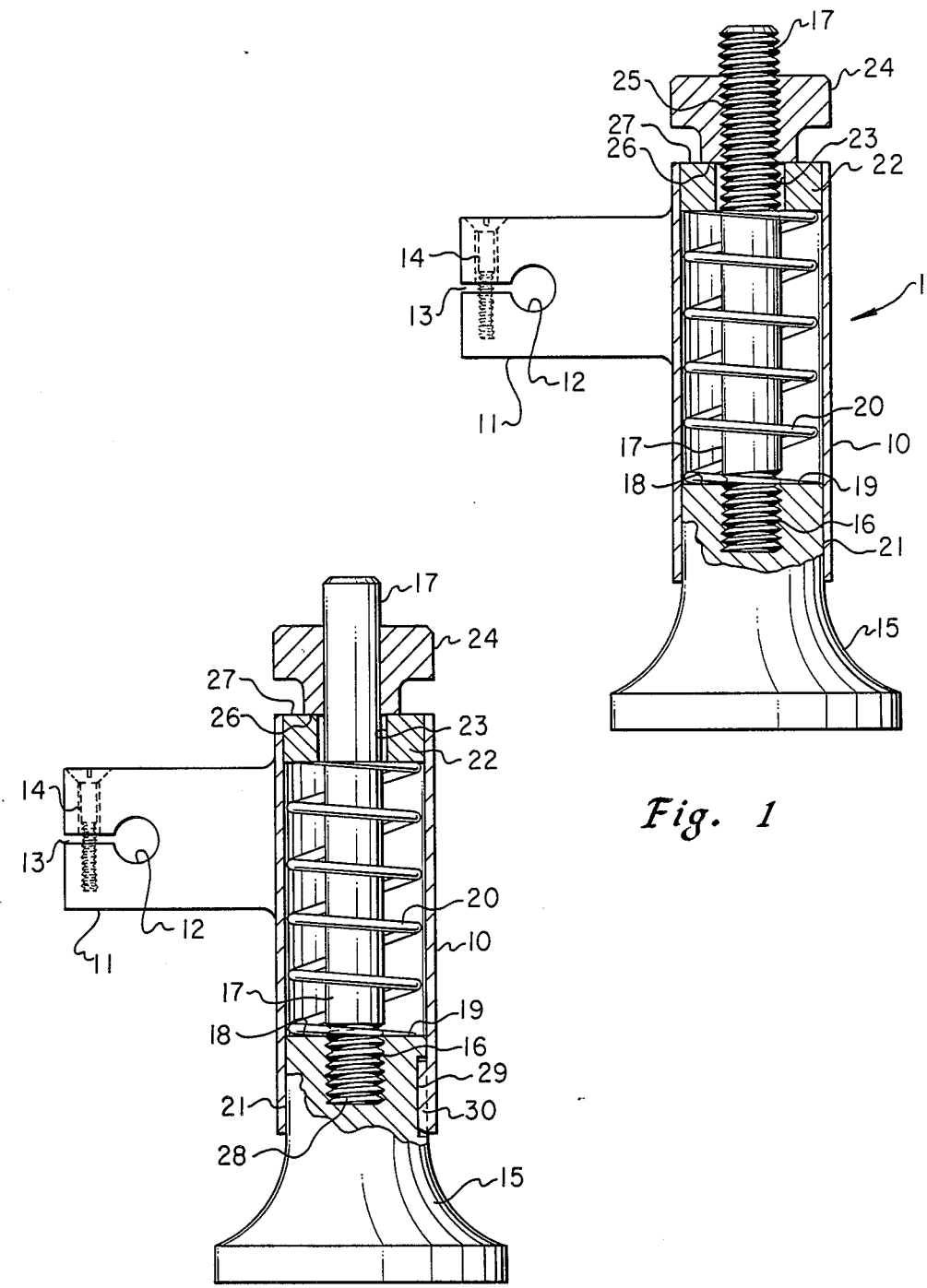
FIG. 1 is a partial cutaway side elevation view of a preferred plow embodying the principles of the invention.
FIG. 2 is a partial cutaway side elevation of an alternate structure embodying the principles of the invention.

Now referring to FIG. 1, it will be observed that it discloses a plow member generally shown at 1 having a cylindrical housing 10 with a projecting arm 11 including supporting and adjustment circular aperture 12. Aperture 12 is adapted for the insertion of a longitudinal support rod as will be described in greater detail below. Also included in projecting arm 11 is slot 13 through which clamping screw 14 extends in conventional fashion to permit tensioning of the inner surface of aperture 12 on the adjacent support rod so that the plow member can be slid laterally to provide longitudinal adjustment, and then clamped in place.

Telescoping within cylindrical housing 10 is a foot member 15 having a threaded recess 16 for threaded engagement with the lower end of adjusting rod 17.

Contacting the upper surface 18 of foot member 15 is the lower end 19 of helical spring 20.

The inner diameter of cylindrical housing 10 is slightly larger than the outer diameter of the upper part 21 of foot member 15 so as to permit member 15 to freely telescope up within housing 10.

At the upper end of housing 10 there is located a collar 22 having a circular aperture 23 extending therethrough and being of slightly larger inner diameter than the outer diameter of adjusting rod 17 so as to permit free slidable movement therethrough. Immediately above collar 22 is knurled adjustment knob 24 which contains a centrally positioned threaded aperture 25 that engages threads on adjusting rod 17 such that as knob 24 is turned, rod 17 is raised or lowered.

Lower surface 26 of knurled knob 24 is in contact with upper surface 27 of collar 22 so that downward pressure on knurled knob 24 conducted from the lower end 19 of spring 20 through the upper surface 18 of foot member 15 and thence through adjusting rod 17 does not result in downward extension of foot member 15 beyond its lower adjustment limit.

It will now be observed that since spring 20 exerts a continuing force on upper surface 18 of foot member 15, foot member 15 will remain in an extended position unless and until some force applied to foot member 15 overcomes the tension of the spring. Such force sometimes occurs when large particles of sludge impact the foot member and the foot member attempts to ride up and over a particle instead of and/or in addition to diverting the particle to one side.

As will be observed from additional inspection of FIG. 1, both the upper and lower portions of adjusting rod 17 are threaded. The lower end is threadably engaged in threaded recess 16 of foot member 15; and according to the embodiment of FIG. 1, the lower end of rod 17 is rigidly affixed to foot member 15 by fully engaging the rod into recess 16 and torquing it into a fixed adherence. At the upper end, however, the threaded portion extends through knurled adjustment knob 24 so that by turning knob 24, the rod is raised or lowered correspondingly. This is made possible by the aforementioned clearance that exists between circular aperture 23 and the threads on rod 17. Accordingly, rod 17 is free to move vertically through slot 23 without vertical impediment, the slot merely acting as a guide.

Figure 3:
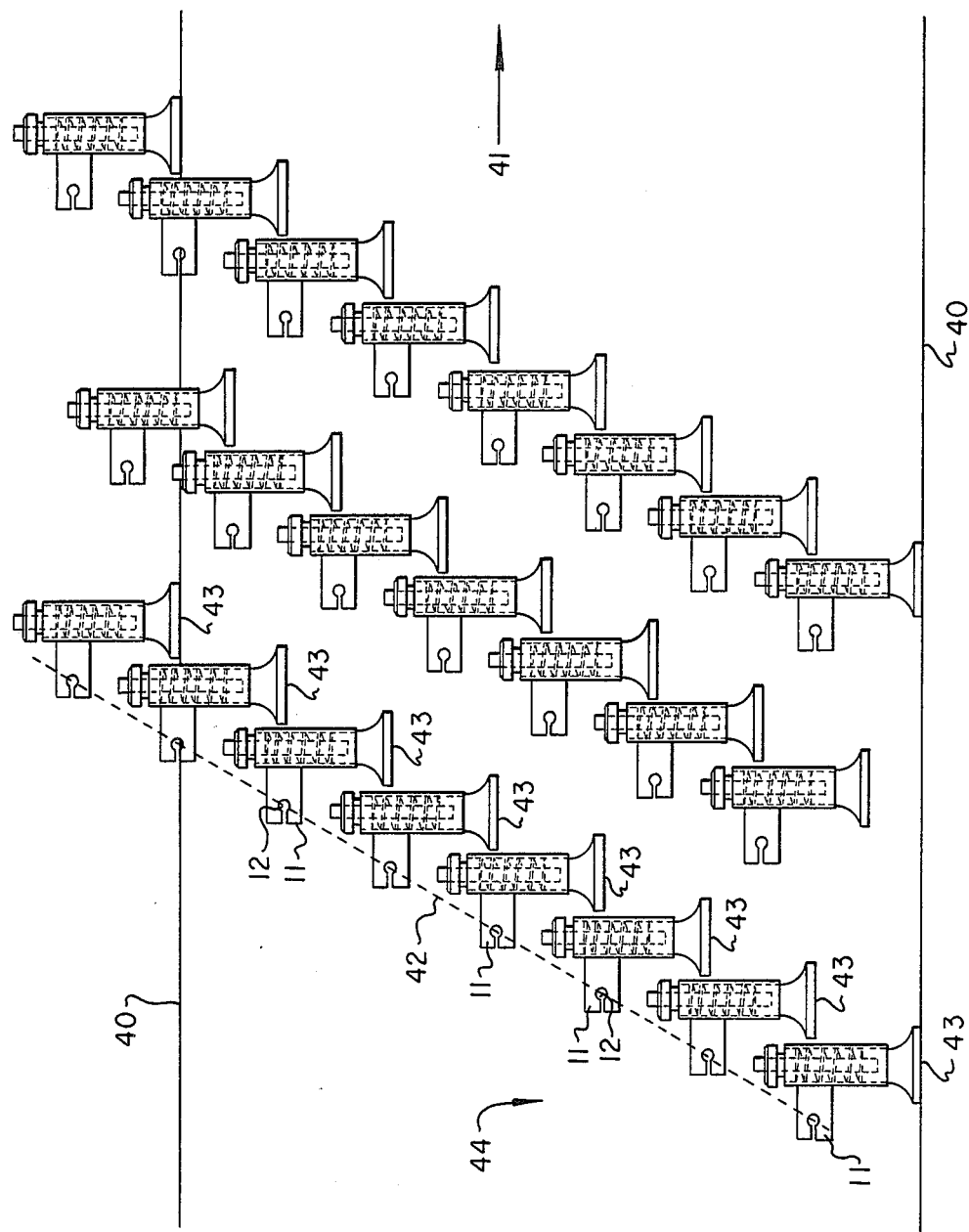
FIG. 3 is a perspective view illustrating deployment of a plurality of the plows in use.

Although in FIG. 1 the threads are shown to extend over a large part of the upper section of rod 17, it will be evident to one skilled in the art that adjustment for sag or other geometric anomalies in an array such as that of FIG. 3, does not require a substantial amount of change in vertical displacement of a slurry head. Accordingly, the threads may be confined to just a section of the rod extending through knurled knob 24 and possibly slightly above. In such event, it would be possible to make the inner diameter of circular aperture 23 very close to the outer diameter of a smooth section of rod 17, thereby facilitating a smooth vertical movement therebetween.

It will now be evident that the improved slurry plow of FIG. 1 permits the vertical adjustment of foot member 15, while at the same time permitting momentary vertical displacement due to shock impact from such articles as sludge conglomerates or discrete non-resilient members, while at the same time providing for a normal extension under the force of spring 20 to the desired normal position. It should also be evident that when mounted on a lateral rod projecting through aperture 12, provision is made for the lateral (i.e., horizontal) suspension and adjustment in the transverse direction.

Now turning to FIG. 2, it will be observed that it includes parts which are in principle similar to those of FIG. 1. There are, however, several significant differences. In the embodiment of FIG. 2, knurled knob 24 and rod 17 are locked together so that turning of knurled knob 24 correspondingly turns rod 17.

In the embodiment of FIG. 2, foot member 15 is loosely threaded through its internally threaded recess 16 to the lower threaded end 28 of rod 17. In order to permit vertical adjustment of foot member 15, a recessed keyway 29 is provided on a surface of foot member 15 and engages a corresponding projection 30 in cylindrical housing 10. Accordingly, when knurled knob 24 is turned, rod 17 correspondingly is turned and the relative movement between the engaging threads of lower end 28 and corresponding threads in recess 16 result in the raising or lowering of foot member 15, recessed keyway 29 and corresponding projecting key 30, preventing foot member 15 from turning, thus causing the threaded engagement to raise or lower member 15.

Now turning to FIG. 3, a plurality of the slurry plows according to FIG. 1 are disposed in an array which extends transversely across a typical conveyor belt on which slurry (not shown) is conventionally transported for dewatering. Such plows are typically deployed in a plurality of parallel arrays. The members in successive arrays being typically offset across the line of travel so as to enhance slurry agitation and facilitate dewatering. In FIG. 3, a section of conveyor belt 40 is disposed to move in the direction of arrow 41, and three arrays of slurry plows are shown. Each array is supported by a circular rod represented by dashed line 42 which, as will be observed, extends through apertures corresponding to aperture 12 on the projecting arm of each plow. As is known to those skilled in the art, there is a tendency for a support member such as rod 42 to assume a catenary or bowed shape and were it not for the above-described individual adjustment for each slurry plow, there would either be a necessity for slurry plows having different overall dimensions, or the array would result in greater clearances between the bottoms 43 and the corresponding upper surface 44. Moreover, it will be evident to those skilled in the art that the upper surface 44 of conveyor 40 in many applications is not perfectly planer, there being some bowing of a convex nature due to the forces of gravity and the non-linearity of conventional supporting members or, in some instances, it may be desirable to bow upwardly, i.e. convex, the surface so as to facilitate the flow of fluid from the center portions transversely toward the conveyor edges. For all of these reasons, it is advantageous to provide individual vertical adjustment of the slurry plows while at the same time retaining a measure of resiliency imparted by the above-described helical springs so as to facilitate relatively unimpeded flow of slurry containing sizeable particles.

As mentioned above, provision is made for lateral movement, i.e. adjustment, of slurry plows transversely in that they may be individually moved along the supporting rods 42 to the desired positions.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A slurry plow comprising a hollow elongated housing having an upper end and a lower end, a foot member having an upper portion adapted for slidable engagement with the lower interior surface of said elongated housing and for telescoping therewithin, biasing means within said housing for resiliently biasing said foot member to a predetermined position with respect to said housing whereby said foot member is correspondingly telescoped a predetermined distance within said housing, adjusting means for adjusting said predetermined distance, and means including said biasing means responsive to the application to said foot member of a force greater than the bias of said biasing means to cause said foot member to telescope an additional distance within said housing.

2. A slurry plow according to claim 1 in which said elongated housing includes a projecting arm extending therefrom, said projecting arm being adapted for adjustably mounting said housing for support thereof.

3. A slurry plow according to claim 2 in which said projecting arm includes an aperture adapted for slidable engagement with a supporting rod.

4. A slurry plow according to claim 1 in which said elongated housing is essentially circular in cross section.

5. A slurry plow according to claim 1 in which said elongated housing is essential cylindrical.

6. A slurry plow according to claim 1 in which said foot member includes an upper portion adapted for slidable telescoping engagement with the lower portion of said elongated housing, and in which the lower end of said foot member is generally bell shaped.

7. A slurry plow according to claim 6 in which said foot member includes on an uppermost surface thereof a threaded recess adapted for engagement with a correspondingly threaded rod.

8. A slurry plow according to claim 1 in which said foot member includes a keyway adapted for slidable mating engagement with a corresponding mating geometry of said housing thereby to prevent turning of said foot member within said housing.

9. A slurry plow according to claim 8 in which said keyway projects upwardly along the surface of from the body of said foot member.

10. A slurry plow according to claim 8 in which said keyway is a slot formed within the body of said foot member.

11. A slurry plow according to claim 1 in which said biasing means includes a spring.

12. A slurry plow according to claim 11 in which said biasing means further includes a rod having a lower end adapted for holding engagement with said foot member, said rod being positioned within said elongated housing.

13. A slurry plow according to claim 7 in which said biasing means further includes a rod having a threaded lower end adapted for threaded holding engagement with said foot member within said threaded recess.

14. A slurry plow according to claim 12 further including at the upper end of said elongated housing, a collar having an aperture therethrough, said rod being slidably extended through said aperture and being guided thereby.

15. A slurry plow according to claim 14 wherein said rod includes in its upper portion a threaded region adapted for mating engagement with an adjusting knob.

16. A slurry plow according to claim 15 wherein said adjusting means for adjusting said predetermined distance includes said threaded portion of said rod.

17. A slurry plow according to claim 16 wherein said adjusting means includes means for controllably effecting relative rotational movement between said rod and said foot member.

18. A slurry plow according to claim 15 wherein said adjusting means includes said adjusting knob.

19. A slurry plow according to claim 18 further including means for preventing said rod from turning and wherein when said adjusting knob is turned in one direction said rod is raised, and wherein when said adjusting knob is turned in reverse direction, said rod is lowered.

20. A slurry plow according to claim 18 further including means for fixing said adjusting knob onto said rod thereby to prevent relative movement therebetween, wherein said foot member includes on the uppermost surface thereof a threaded recess, wherein said rod has a threaded lower end extending into and in threaded engagement with the threads of said threaded recess, whereby, when said adjusting knob is turned in one direction, said rod further extends within said recess, thereby correspondingly raising said foot member, and when said adjusting knob is turned in the reverse direction, said rod correspondingly withdraws from said recess, thereby lowering said foot member.

* * * * *

UNITED STATES PATENT AND TRADEMARK OFFICE
CERTIFICATE OF CORRECTION

PATENT NO. : 4,879,033

DATED : November 7, 1989

INVENTOR(S) : Rich, Arthur R.

It is certified that error appears in the above-identified patent and that said Letters Patent is hereby corrected as shown below:

Column 5, line 23, the word "from" should be deleted from the sentence.

Signed and Sealed this

Eighteenth Day of September, 1990

Attest:

HARRY F. MANBECK, JR.

Attesting Officer     Commissioner of Patents and Trademarks